Patented Nov. 27, 1951

2,576,311

UNITED STATES PATENT OFFICE 2,576,311

METHOD OF REDUCING AND HYDROGENATING CHEMICAL COMPOUNDS BY REACTING WITH ALUMINUM-CONTAINING HYDRIDES

Hermann I. Schlesinger and Albert E. Finholt, Chicago, Ill.; said Schlesinger assignor of one-fourth to Edna M. Schlesinger and said Finholt assignor of one-fourth to Marion L. Finholt No Drawing. Application June 3, 1947, Serial No. 752,286

27 Claims. (Cl. 260—638)

This invention relates to methods of making aluminum-containing hydrides and the reactions thereof, and also relates to products prepared by said methods.

This application is a continuation-in-part of our copending application Serial No. 717,312, filed December 19, 1946, now Patent No. 2,567,972, issued September 18, 1951.

We have discovered that these compounds, especially the ether soluble lithium aluminum hydride, are extremely useful chemical reagents. They may be employed for replacing halogens or organic radicals by hydrogen in a great variety of compounds. As a result, their discovery has led to new methods, safer, more convenient, and more efficient than those hitherto known, for producing hydrides of other elements or for producing derivatives of such hydrides, as well as for reducing certain types of organic halides to the corresponding hydrocarbons. Furthermore, these aluminum-containing hydrides are strong reducing agents and have been effectively used in reducing a great variety of organic compounds. Examples are the reduction of carbon dioxide to derivatives of formaldehyde, of esters to alcohols or aldehydes, of nitro compounds to azo compounds, of nitriles to amines, and the like. In many instances these reductions are more efficiently and conveniently carried out than with hitherto used reducing agents. A particular advantage of the aluminum-containing hydrogen compounds is the specificity of their reactions; thus, in general they reduce functional groups, such as the carbonyl, nitro, and other reducible groups, of compounds containing an unsaturated carbon to carbon linkage without attacking the carbon to carbon link.

The new hydrides include a new aluminum hydride-ether complex, alkali metal aluminum hydrides, and alkaline earth metal aluminum hydrides. In general, these are prepared by reacting an aluminum halide with an alkali metal hydride or an alkaline earth metal hydride.

One of the most important of the new hydrides is lithium aluminum hydride having the formula $LiAlH_4$. Although this new compound will be called lithium aluminum hydride in the present application, it may also be called lithium aluminohydride or lithium tetrahydroaluminide. In one method of making lithium aluminum hydride, lithium hydride is reacted with an aluminum halide such as aluminum chloride in the presence of a suitable liquid medium such as an ether. If the reagents are mixed in the proportions of the following equation, or if an excess of lithium hydride is used, the reaction proceeds as follows:

$$4LiH + AlCl_3 \rightarrow LiAlH_4 + 3LiCl$$

The liquid medium used is one in which one of the reaction products, e. g., the lithium chloride is insoluble, and the other, e. g., lithium aluminum hydride, is soluble or vice versa. This provides easy separation of the reaction products. The preferred liquid is an ether as in the ether the lithium aluminum hydride is soluble while the lithium chloride is not. After removing the insoluble materials, the solvent is removed by evaporation leaving the solid lithium aluminum hydride. The solvent may be evaporated first at ordinary temperatures and pressures and finally at higher temperatures under reduced pressures. In this reaction three gram equivalents of aluminum chloride are reacted with four gram equivalents of lithium hydride. The term "gram equivalent" means the quotient of the gram molecular weight of the compound by the product of the valences of the ions of the compound.

In carrying out the above reaction, the two solids may first be mixed with each other in a suitable apparatus and the liquid solvent then added. In an alternate procedure, the solid lithium hydride may be introduced into the reaction vessel and then the aluminum chloride may be added, preferably as a solution in the liquid to be used. This latter is the preferred procedure. It is also preferred that the air be displaced from the reaction vessel by an inert gas such as dry nitrogen. This is not essential, however, since the reaction has been carried out in air of ordinary humidity.

When the reacting materials are mixed, the mixture usually becomes warm. Ordinarily, however, this incipient reaction soon stops or becomes too slow to be readily appreciable. After an induction period, which may be only a few minutes in length or may last for several hours, the reaction again sets in, usually with such vigor that cooling of the mixture is necessary. This induction period is undesirable for several reasons. It is difficult or impossible to foretell when the vigorous reaction will begin. It is therefore necessary that the reaction mixture be closely watched in order that the cooling may be begun before the reaction has become too vigorous for safety. It has been found that the induction period may be eliminated by adding to the lithium hydride a relatively small amount of previously prepared lithium aluminum hydride, preferably dissolved in the liquid that is used in the reactions. When this is done, the reaction proceeds smoothly on addition of the aluminum halide. Under these conditions, the rate of reaction may be conveniently controlled by controlling the rate of addition of the aluminum halide, which is preferably added in the form of a solution. Among the preferred solvents are the ethers such as diethyl ether, dibutyl ether, dioxane, and any other liquid ether non-reactive toward lithium aluminum hydride. For best results, the liquid used should be anhydrous and the aluminum halide should be reasonably free from hydrogen halide. In all of the operations, moisture should be excluded although it is not necessary to work under absolutely anhydrous conditions. The alkali metal and alkaline earth metal hydrides that are used should be of good quality. It is preferred that each of these materials be used in a finely powdered condition, preferably between 100 and 200 mesh.

Although it is preferred that a solvent such as an ether be used, this is not absolutely necessary. The aluminum halide and the hydride may be reacted in the absence of a liquid, but the reaction is sometimes difficult to control.

Aluminum hydride is closely related to the lithium aluminum hydride in its chemical properties. Aluminum hydride may be prepared by reacting aluminum halides with either lithium hydride or lithium aluminum hydride. Any similar hydride of an alkali metal or an alkaline earth metal may be used in place of the lithium compound in producing the aluminum hydride. When the reagents are mixed in the proper proportions the reaction of aluminum chloride and lithium hydride proceeds as follows:

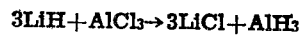

$$3LiH + AlCl_3 \rightarrow 3LiCl + AlH_3$$

The reaction between aluminum chloride and lithium aluminum hydride proceeds according to the following:

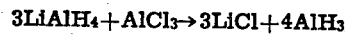

$$3LiAlH_4 + AlCl_3 \rightarrow 3LiCl + 4AlH_3$$

As can be seen, it is not necessary separately to prepare lithium aluminum hydride as the reaction may be controlled so that it occurs only as an intermediate product with the reaction continuing to produce lithium chloride. The above reactions are preferably carried out in the presence of a liquid solvent such as ether. Most of the ether may be removed from the aluminum hydride by evaporation. It is impossible, however, to remove all of the ether by evaporation without decomposing the hydride. If the ether is removed at room temperature without extensive evacuation, the solid product has a composition approximating the formula

$$2AlH_3 \cdot O(C_2H_5)_2$$

Its composition, however, depends on the time and temperature during ether removal. Thus by heating the solid at 90° C. in vacuo for several hours, the composition may reach proportions corresponding to $6AlH_3 \cdot O(C_2H_5)_2$. Irrespective of its composition, the solid is at best only slightly soluble in ether. Nevertheless, either the original solution of aluminum hydride or the ether insoluble solids may be used in place of lithium aluminum hydride.

As can be seen from the first and second equations set out herein, lithium hydride and aluminum chloride may be reacted together to form either lithium aluminum hydride or aluminum hydride. The final product is determined by the proportions of the reacting materials. Thus, to prepare lithium aluminum hydride four moles or more of lithium hydride are reacted per mole of aluminum chloride. If the final product is to be aluminum hydride, only three moles of lithium hydride are reacted per mole of aluminum chloride. As has been pointed out above, it is possible to use aluminum halides other than the chloride. It is also possible to use hydrides of alkali metals other than lithium, or hydrides of the alkaline earth metals.

The new compound lithium aluminum hydride is a white solid that is stable in dry air at room temperature. It may be heated without appreciable decomposition to temperatures below 100° C. in a vacuum. Above 100° C., it decomposes slowly, but the rate of decomposition increases with rise in temperature. At 150° C., the decomposition can be observed by color changes after a relatively short time. The products of decomposition are lithium hydride, aluminum, and hydrogen. The new compound is soluble in diethyl ether to the extent of about 25 grams per 100 grams solvent. It is also soluble in other ethers. The new compound reacts with water to give hydrogen, and either lithium hydroxide and aluminum hydroxide, or lithium aluminate. This reaction is quite rapid. In spite of this, the compound does not decompose very rapidly on exposure to air of even fairly high humidity. It is believed that this is true because the solid becomes coated with a protective layer of reaction product.

In a typical embodiment of the method of making lithium aluminum hydride, 0.02 mole of anhydrous aluminum chloride was mixed with 0.50 mole of lithium hydride under dry nitrogen in a flask. The flask was then attached through a standard taper to a vacuum system and evacuated. 15 cc. of anhydrous diethyl ether were distilled into the flask by condensing the ether in with liquid nitrogen. The mixture was warmed until a reaction occurred. The reaction was allowed to proceed vigorously, but was kept under control by cooling the flask with liquid nitrogen from time to time. The total reaction time was approximately five minutes. When the reaction was thus carried out in the vacuum, no induction period occurred.

In another example of making lithium aluminum hydride, a reaction vessel was used having three necks to which were attached a mercury sealed stirrer, a dropping funnel, and a bulb condenser. The open ends of the condenser and the funnel were protected from moisture by calcium chloride drying tubes. The reaction vessel and its attachments were dried and flushed with dry nitrogen. Into the flask was placed 25 cc. of a solution containing 10 grams of lithium aluminum hydride per 100 grams of diethyl ether. 30 grams of lithium hydride were dropped into the solution and the mixture was stirred for a short time. Through the dropping funnel a solution of 100 grams of aluminum chloride and 500 cc. of diethyl ether was added slowly with continuous stirring. The addition rate was so controlled that the boiling in the reaction vessel was kept constant thus showing a smooth reaction. Stirring was continued for a short time after the addition of aluminum chloride was finished and until the reaction appeared to cease. The reaction product was filtered through a sintered glass disk under a pressure of dry nitrogen to remove the lithium chloride and the excess of lithium hydride. The ether was distilled from the filtrate at atmospheric pressure until a thick syrup was formed. The last of the ether was removed under vacuum and by heating the product at about 70° C. In general, the yields were from 85 to 90% of the theoretical and the purity varied from 93 to 98%.

In the procedure just described, a small amount of lithium aluminum hydride was added to the reaction mixture to avoid the induction period. When lithium aluminum hydride is not available for this purpose a procedure in all respects like that described above, except that dioxane is used in place of diethyl ether and that the reflux temperature is higher, may be employed with relatively small quantities of the reagent. The solid product resulting from the removal of the dioxane from the filtered solution may then be used to start the reaction in the procedure described above. In carrying out this procedure, it is preferred that a small amount of diethyl ether be added before filtering the reaction mixture. This is done because the lithium aluminum hydride is more soluble in diethyl ether than in dioxane.

In a typical preparation of aluminum hydride from lithium hydride according to the following reaction:

$$3LiH + AlCl_3 \rightarrow AlH_3 + 3LiCl$$

a solution of 33.00 g. (0.248 mole) of aluminum chloride in 70 g. of anhydrous diethyl ether was added during a 20 minute period to a nitrogen filled reaction vessel containing a mixture of 5.90 g. (0.743 mole) of lithium hydride, 0.3 g. of lithium aluminum hydride, and 240 g. of ether. (It is to be noted that the relative quantity of aluminum chloride was as nearly as possible that demanded by the equation, and that a relatively large amount of ether was used.) The reaction mixture was stirred for one hour after completing the addition of aluminum chloride. The precipitated lithium chloride was removed by passing the solution through a sintered glass disk. The solution was analyzed and found to contain approximately 6.3 g. (0.21 mole) of aluminum hydride, or about 85% of the theoretical.

In preparing aluminum hydride from lithium aluminum hydride according to the following reaction:

$$3LiAlH_4 + AlCl_3 \rightarrow 4AlH_3 + 3LiCl$$

a solution of 0.547 g. (0.0144 mole) of lithium aluminum hydride in 9.10 g. of anhydrous diethyl ether was placed in a reaction vessel which had been flushed out with nitrogen. To the solution, after further addition of 15 g. of ether, 0.629 g. (0.00472 mole) of anhydrous aluminum chloride was added. A vigorous reaction occurred, but soon subsided. The precipitated lithium chloride was removed from the solution by filtration, and the ether was evaporated from the filtrate under vacuum conditions, leaving a white, non-volatile solid. The latter was slowly heated in vacuo to about 96° C. at which temperature a small amount of hydrogen was evolved and the white solid started to turn grey. The flask was immediately cooled. The resulting material had a composition corresponding to the formula 4.5 $AlH_3 \cdot O(C_2H_5)_2$ and the quantity obtained represented a 92% yield of aluminum hydride.

In the preparation of sodium aluminum hydride, sodium hydride is reacted with an aluminum halide using an ether as a solvent. In a specific preparation, the aluminum halide was aluminum bromide and the ether was dimethyl ether. As dimethyl ether has a boiling point that is below room temperature, the reaction was carried out under pressure in order to maintain the dimethyl ether in the liquid state at room temperature. In the actual preparation 3.345 g. of sodium hydride was mixed with 4.470 g. of aluminum bromide that had previously been freed from hydrogen bromide in vacuo. These were mixed at a low temperature with 15 to 20 cc. of liquid dimethyl ether, and the reaction vessel was sealed off and warmed to room temperature. The quantity of dimethyl ether was such that a considerable amount of the latter remained in a liquid state at room temperature. The mixture was stirred for three hours after which the residual solid was removed from the liquid by filtration through a filter disk. The dimethyl ether was evaporated leaving the solid sodium aluminum hydride ($NaAlH_4$). 0.54 g. of sodium aluminum hydride was recovered, representing a 60% yield.

The properties of sodium aluminum hydride are like those of the lithium compound except that the sodium compound is somewhat more stable toward thermal decomposition and is only very slightly soluble in diethyl ether.

The aluminum hydride, alkali metal aluminum hydrides and alkaline earth metal aluminum hydrides may be used to reduce or hydrogenate (terms which are used interchangeably herein) a great variety of compounds, organic and inorganic. In setting forth the valuable results which may be achieved by means of these substances it is desirable to define certain terms. An "inorganic reactant" is defined as consisting of the class of ionizable or hydrolyzable halides of metals and of readily hydrolyzable alkyl and aryl compounds of metals excluding the alkali metals but including as metals, in addition to those universally so classified, the elements boron, silicon, arsenic and antimony.

The term "an organic derivative of an inorganic reactant" is used to designate a compound, containing a metal, as defined above, combined with one or more halogen atoms and with one or more difficultly hydrolyzable alkyl or aryl groups, as for example, diethyldichloro silane. It is to be noted that the terms inorganic and organic compounds are employed as is customary in chemical literature.

The term "organic reactant" is further defined as a compound in which one or more halogen atoms are attached (or bound) to a carbon atom, which in turn, is attached (or bound) to hydrogen or to groups designated by $R_1$, $R_2$, $R_3$; if the halogen is iodine, these groups may be any aliphatic, aromatic, substituted aliphatic or substituted aromatic radical, but when the halogen is chlorine or bromine the reaction proceeds most favorably when at least one of the groups designated by $R_1$, $R_2$, $R_3$ is an aromatic or an unsaturated aliphatic radical.

Through the use of the new compounds herein described, inorganic hydrides and their organic derivatives may be prepared by the interaction of the new hydrides with inorganic reactants or with organic derivatives of inorganic reactants as is illustrated by the generalized equation:

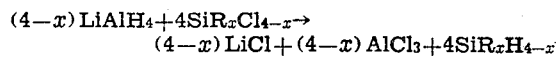

$$(4-x)\text{LiAlH}_4 + 4\text{SiR}_x\text{Cl}_{4-x} \rightarrow$$
$$(4-x)\text{LiCl} + (4-x)\text{AlCl}_3 + 4\text{SiR}_x\text{H}_{4-x}$$

in which $x$ may vary from 0 to 3 and R is an alkyl or an aryl group. Examples of silicon compounds thus obtained are: silicon hydrides, methyl silicon hydrides, ethyl silicon hydrides, propyl silicon hydrides, monophenyl silicon hydrides, diethyl silicon hydrides, dibutyl silicon hydrides, and many others of similar nature. Similar reactions occur with inorganic reactants other than silicon compounds and with their organic derivatives, as in the case of compounds of germanium, tin, arsenic, antimony and the like.

This new method of preparation is far more convenient than any hitherto known and, in general, gives better yields. The preferred procedure is to carry the reactions out in an ether solution such as diethyl ether. In case the desired product has a volatility so nearly that of diethyl ether as to cause difficulty in separating the ether from the solvent, ethers other than the diethyl ether, or other solvents, may be employed. The reactions may usually be carried out at room temperatures but often proceed satisfactorily at much lower temperatures or may be carried out at any temperature below the boiling point of the solutions or the decomposition temperatures of the new compound.

Another example of the use of the new compounds is in the formation of hitherto unknown inorganic hydrides, such as zinc hydride. In this case the inorganic reactant may be either zinc chloride or an alkyl-zinc compound. Hydrides of beryllium and of aluminum have been obtained by similar reactions.

When compounds herein designated as "organic reactants" are treated with the new hydrides, hydrocarbons are formed. Examples are the reduction of methyl iodide to methane, allyl bromide to propene, and benzyl chloride to toluene. Organic compounds, other than those herein defined as organic reactants, may also be reduced, but in such cases reduction does not proceed to the hydrocarbon stage. Thus acids, esters, ketones, quinones, and other compounds containing carbon doubly linked to oxygen, i. e., containing a carbonyl group, may be reduced to alcohols; aromatic nitro or nitroso compounds are reduced to azo compounds, aliphatic nitro compounds are reduced to amines, as are nitriles.

The advantages of the new hydrides in the reduction of organic compounds may be summarized as follows: In some instances, as in the reduction of organic (carboxylic) acids the use of these new hydrides constitutes the only general method for accomplishing the desired result. A second advantage is that the reaction of the new hydrides is often highly specific. Thus aromatic nitro compounds may be reduced to produce only azo-compounds and nitriles may be reduced to produce only primary amines. Furthermore, in an organic compound which also contains an unsaturated carbon-to-carbon linkage, a reducible functional group may be reduced without reduction (hydrogenation) of the unsaturated linkage, as occurs, for example, in compounds containing an olefinic linkage such as crotonaldehyde, methyl oleate, allyl bromide or sorbic acid, and in compounds containing acetylenic linkages such as propiolic acid. If, however, the unsaturated link is activated by its position relative to other functional groups, as for example by the phenyl and carboxyl groups of cinnamic acid, the unsaturated link may be, but is not necessarily, also reduced. A third advantage of the use of the new hydrides is that reductions carried out with them may be effected in homogeneous systems, or in substantially homogeneous systems. Reaction in a homogeneous system means a reaction in which all of the reacting substances, but not necessarily the reaction products, are present in a single phase, such as in solution; reaction in a substantially homogeneous system means a reaction in which one or both of the reactants, but not necessarily the reaction products, are at least partially soluble in the liquid medium employed. A fourth advantage of the use of these hydrides is in the variety of temperatures which may be employed to suit the requirements of special cases. Thus some reactions, for example the reduction of benzoyl chloride, may be effected at temperatures as low as —80° C.; in other cases temperatures as high as 65° C. have been employed to accelerate the reactions. The maximum temperature should, however, not be above that at which the hydrides decompose. For this reason the reaction temperature may be stated as lying approximately between —80° C. and +125° C., though with certain of the hydrides temperatures as high as 150° C. might be used. A fifth advantage in the use of the new hydrides is the fact they do not ordinarily cause the condensations and the polymerization reactions which often accompany the use of other reducing agents; consequently these hydrides in practically all cases produce the purer products.

The reductions by the new hydrides are preferably carried out in ether solutions, diethyl ether being the preferred ether because of its ready availability. Other ethers, however, may be used when the particular hydride employed or the compound to be reduced is more soluble in such other ethers than in diethyl ether, or if a higher temperature than can be attained in the presence of diethyl ether is desirable. When one of both reactants are only slightly soluble in the solvent employed, the latter may be recirculated through the materials until the reaction is substantially complete.

In many, though not all of the reductions of organic compounds, the initial reduction product consists of aluminum and lithium salts of the desired compound. Such salts are formed, for example, where the ultimate products are alcohols or amines. In such cases, the salt first formed is hydrolyzed by water or by aqueous acids or aqueous bases to obtain the final reduction products.

The specific reduction of n-heptaldehyde to n-heptanol is as follows:

A two liter flask was equipped with a stirrer, dropping funnel, and a reflux condenser (both the dropping funnel and reflux condenser were protected with calcium chloride drying tubes). To a solution of lithium aluminum hydride, prepared from 100 g. of aluminum chloride, 28 g. of lithium hydride, and 1 liter of diethyl ether, 200 g. of redistilled n-heptaldehyde was added dropwise so as to maintain gentle refluxing. One hour after the last addition of aldehyde, 30 cc. of wet ether (1 water : 3 ether) was added dropwise. The addition of 29 cc. caused the mixture to reflux gently. Then 40 cc. of water was added dropwise but no further reaction took place. The mixture was then poured into 300 cc. of ice water and acidified with one liter of 10% sulfuric acid. After separation of the ether layer, the aqueous layer was extracted with two further 100 cc. portions of ether. The product obtained after evaporation of the ether from the dried ether extracts was fractionally distilled. An 86% yield of n-heptyl alcohol was obtained.

The specific reduction of ethyl benzoate to benzyl alcohol is as follows:

To a solution of 1.5 g. of lithium aluminum hydride in 22 g. of diethyl ether, 12.6 g. of ethyl benzoate was added dropwise. Each drop reacted vigorously and the solution became very viscous. No precipitate appeared however. The mixture was refluxed 2 hours and was then allowed to stand for a day. The mixture was poured into water, acidified with hydrochloric acid and the ether layer was separated. After the ether had been removed by distillation, 50 ml. of 25% NaOH solution was added and the mixture was refluxed for 3 hours. The ether extract was dried over sodium sulfate, then heated to remove the ether. The residue, a light yellow oil, weighed 8 grams. This represents an 88% yield of benzyl alcohol.

The first of the two preceding examples illustrates a case in which the LiAlH4 was not isolated from the ether solution in which it was prepared.

The second illustrates a reaction starting with the solid LiAlH4.

The preparation of zinc hydride from zinc methyl is as follows:

A solution of 0.6 g. of lithium aluminum hydride in 10 g. of diethyl ether was placed in a reaction vessel connected with a vacuum system by a standard ground glass joint. Zinc methyl, 136 cc. (gaseous at standard conditions) was condensed into the flask after the latter had been cooled with liquid nitrogen and evacuated. The mixture was allowed to warm slowly to room temperature and formation of a white precipitate occurred. The reaction mixture was filtered and the precipitate was washed several times with ether. The precipitate was heated at 50° C. in vacuo to remove the last traces of ether. Zinc hydride weighing 0.389 g. was obtained for a yield of 95%.

The reduction of o-tolunitrile to o-xylylamine is as follows:

A three-necked one-liter flask equipped with a reflux condenser, mechanical stirrer, and dropping funnel was used. The condenser and funnel were protected with calcium chloride drying tubes. Two-tenths of a mole (23.4 g.) of ortho-tolunitrile (B. P. 92–94° C./16 mm.) was dissolved in 200 cc. of ether and added dropwise to 0.2 mole of lithium aluminum hydride (in 300 cc. of ether). After the last addition, water was added to destroy the excess hydride. Then 500 cc. of a 20% solution of sodium potassium tartrate (a sodium hydroxide solution can also be used to dissolve the aluminum hydroxide) was added and the water layer extracted with three 100 cc. portions of ethyl ether. The ether was removed and the orthoxylylamine collected at 134° C./85 mm. ($n_D^{20}$ 1.5412). The yield was 21.3 grams or 88% of the theoretical. The benzamide derivative was prepared and melted at 88° C.

The reduction of para-nitrobromobenzene to 4,4′-dibromoazobenzene is as follows:

A one-liter three-necked flask equipped with a reflux condenser, mechanical stirrer, and dropping funnel was used. The condenser and funnel were protected with calcium chloride drying tubes. One-tenth of a mole (20 grams) of para-nitrobromobenzene (M. P. 127° C.) was dissolved in 150 cc. of ether and added dropwise to 0.15 mole of lithium aluminum hydride (in 250 cc. of ether). After the last addition, water was added to destroy the excess hydride, and then 150 cc. of 10% sulfuric acid added to dissolve the aluminum hydroxide. The azo-compound was insoluble in water and only slightly soluble in ether and remained between the water-ether layers. Therefore the azo-compound was filtered off and combined with the small amount found in the ether extract. The compound was washed with hot water and dried in vacuo over calcium chloride. The yield of 4,4′-dibromoazobenzene melting at 203° C. was 15 grams or 88% of the theoretical.

The reduction of cetyl iodide to n-hexadecane is as follows:

A one-liter three-necked flask equipped with a reflux condenser, mechanical stirrer, and dropping funnel was used. The funnel and reflux condenser were protected with calcium chloride drying tubes. One-tenth mole (35.2 grams) of cetyl iodide (B. P. 190° C./6 mm. and $n_D^{24}$ 1.4810) was dissolved in 100 cc. of ether and added dropwise to 0.05 mole of lithium aluminum hydride (in 300 cc. of ether). The mixture was heated for six hours under reflux after the last addition of organic halide and then allowed to stand overnight before the excess hydride was destroyed with water. Next 150 cc. of 10% sulfuric acid was added, and the aqueous layer extracted with two 100 cc. portions of ether, and the ether extract dried over three grams of calcium chloride. The ether was removed and a 95% yield of n-hexadecane boiling at 147° C./9 mm., $n_D^{20}$ 1.4340, and M. P. 17.5° C. was obtained.

The reduction of 2-nitrobutane to 2-aminobutane is as follows:

A one-liter three-necked flask was equipped with a reflux condenser, dropping funnel, and a mechanical stirrer. The funnel and condenser were protected with calcium chloride drying tubes. To 0.096 mole of lithium aluminum hydride (in 130 cc. of ether) 0.0485 mole (5 grams) of 2-nitrobutane dissolved in 50 cc. of ether was added. After the last addition, water was added to decompose the excess hydride, and 250 cc. of 10% sodium hydroxide added. The aqueous layer was extracted with four 100 cc. portions of ether and the ether extract dried over potassium hydroxide. Three grams of sec-butyl amine or 85% of the theoretical amount which boiled at 63° C./750 mm. was obtained. The benzamide derivative was prepared and melted at 75–75.5° C.

It is not always desirable or essential to isolate the alkali metal aluminum hydride or the like prior to a reduction. For example, the preparation of diethylsilane from diethyldichlorosilane may be as follows:

A suspension of 14 g. (5.8 mole) of sodium hydride suspended in 200 g. of anhydrous dioxane was heated to reflux temperature in an apparatus which had been flushed out with nitrogen. 16 g. (0.10 mole) of diethyldichlorosilane and 44 g. (0.33 mole) of aluminum chloride was then added and refluxing continued several hours. The resulting mixture was then distilled; the fraction boiling between 60° and 100° C., at which temperature diethylsilane had all been removed, was collected. This fraction amounted to about 30 g. The product was refractionated through a Vigreaux column to give 4 g. of a sample boiling between 50 and 55° C. After repurification of the material in a vacuum system, a 2 g. (0.023 mole) sample having a molecular weight of 88.8 (calculated molecular weight 88.2) was isolated. This amounted to a yield of 23%.

The preparation of silane from silicon tetrachloride is as follows:

A solution of 0.348 g. (9.19 m. moles) of lithium aluminum hydride in 12.5 g. of diethyl ether was placed in a reaction vessel connected with a vacuum system by a standard ground glass joint. Somewhat less than the equivalent amount of silicon tetrachloride, 175.2 cc. (7.82 m. moles) was condensed into the flask after the latter had been cooled with liquid nitrogen and evacuated. The mixture was allowed to warm slowly to about 0°, at which temperature rapid evolution of gas and the formation of a white precipitate occurred.

The volatile material was fractionated through an isopentane bath (−159°) and the silane collected at liquid nitrogen temperature. A 99% yield (175.0 cc.), based on the amount of silicon tetrachloride used, was obtained. The molecular weight of the product was 31.9 (calc. 32.1), the vapor tension at −111.9° was 781 mm., or somewhat higher than the 760 mm. value reported by Stock and Somieski.

The preparation of n-dipropylsilane from n-dipropylchlorosilane is as follows:

To a solution of 10.0 g. (0.264 mole) of lithium aluminum hydride in 22.5 g. of diethyl ether, contained in an apparatus, which had previously been flushed with nitrogen, 77.8 g. (0.421 mole) of n-dipropylchlorosilane was added with constant stirring at a rate to keep the mixture refluxing gently. After completion of the addition, the mixture was maintained at refluxing temperature for one hour, and was then filtered. Most of the volatile material was distilled from the filtrate at atmospheric pressure; when the temperature of the vapor reached 110°, the remaining portion was removed at 70° and 1 mm. pressure. The distillate was fractionated to obtain 39.1 g. (80% yield) of n-dipropylsilane, B. P. 110–112° (uncorrected).

The following tabulated examples, listed as to starting materials and final products, represent several types of reactions. Thus, there is the reduction of aldehydes to alcohols, acid chlorides to alcohols, acid anhydrides to alcohols, acids to alcohols, esters to alcohols, ketones to alcohols, nitriles to primary amines, nitro to azo compounds, nitro to amino compounds, quinones to hydroquinones, organic halides to hydrocarbons, sulfonyl compounds to thioalcohols, as well as the reduction of carbon dioxide and phosgene. Many other types of reactions are possible as the new compounds disclosed herein are excellent reducing and hydrogenating agents.

A list of some of the many compounds which are reduced or hydrogenated and the products that are formed are as follows:

| Starting Material | Product |
|---|---|
| Heptaldehyde | N-Heptyl Alcohol. |
| Crotonaldehyde | Crotyl Alcohol. |
| Benzaldehyde | Benzyl Alcohol. |
| Benzoyl Chloride | Benzyl Alcohol. |
| Palmityl Chloride | Hexadecanol-1. |
| Isocaproyl Chloride | Isohexyl Alcohol. |
| Trimethylacetyl Chloride | Neopentyl Alcohol. |
| Symmetrical ortho-Phthalyl Chloride | Phthalyl Alcohol. |
| Sorbyl Chloride | Sorbyl Alcohol. |
| Benzoic Anhydride | Benzyl Alcohol. |
| Phthalic Anhydride | Phthalyl Alcohol. |
| Benzoic Acid | Benzyl Alcohol. |
| Cinnamic Acid | Hydrocinnamyl Alcohol. |
| Phenylacetic Acid | B-Phenylethyl Alcohol. |
| Trimethylacetic Acid | Neopentyl Alcohol. |
| Stearic Acid | Octadecanol-1. |
| Furoic Acid | Furfuryl Alcohol. |
| Salicyclic Acid | O-Hydroxybenzyl Alcohol. |
| O-Chlorobenzoic Acid | o-Chlorobenzyl Alcohol. |
| Sorbic Acid | Sorbyl Alcohol. |
| Phenyl Propiolic Acid | Phenylpropargyl Alcohol. |
| Anthranilic Acid | o-Aminobenzyl Alcohol. |
| Benzoylformic Acid | Phenylethyleneglycol. |
| Sebacic Acid | Decanediol-1, 10. |
| Chloral Hydrate | B.B.B,-Trichloroethanol. |
| Ethyl Hydrogen Sebacate | Decanediol-1, 10. |
| Ethyl Benzoate | Benzyl Alcohol. |
| Ethyl Palmitate | Hexadecanol-1. |
| Methyl Laurate | Dodecanol-1. |
| Ethyl Adipate | Hexandiol-1, 6. |
| Methyl Oleate | Oleyl Alcohol. |
| n-Butylmalonic Ester | 2-Butylpropyleneglycol. |
| Acetone | Isopropyl Alcohol. |
| Butanone-2 | Sec.-Butyl Alcohol. |
| Cyclopentanone | Cyclopentanol. |
| Cyclohexanone | Cyclohexanol. |
| Acetomesitylene | Mesitylmethylcarbinol. |
| Acetonitrile | Ethyl amine. |
| o-Tolunitrile | o-Xylylamine. |
| Benzonitrile | Benzylamine. |
| Sebaconitrile | 1,10-Diaminodecane. |
| Nitrobenzene | Azobenzene. |
| p-Nitrobromobenzene | 4,4-Dibromoazobenzene. |
| Nitromesitylene | Azomesitylene. |
| Azoxybenzene | Azobenzene. |
| p-Nitrosodimethylaniline | Azodimethylaniline. |
| 2-Nitrobutane | 2-Aminobutane. |
| Quinone | Hydroquinone. |
| Phenanthraquinone | Phenanthrahydroquinone. |
| Allyl Bromide | Propene. |
| Methyl Iodide | Methane. |
| Cetyl Iodide | Hexadecane. |
| Benzyl Chloride | Toluene. This reaction is effected only by running at a higher temperature than the boiling point of ether. Tetrahydrofuran was used as a solvent. |
| Benzene Sulfonyl Chloride | Mixture of Thiophenol and Phenyl disulfide. |
| Phosgene | Methanol. |

In the explanation of the invention, reductions of unsaturated esters, acids, aldehydes, and other carbonyl containing organic compounds, to alcohols in which the double or triple bonds remain intact, have been described for relatively simple aliphatic and aromatic compounds. The reduction of steroid compounds, and substances containing two or more double bonds, such as in compounds which are related to vitamin A, but which contain

or

as terminal groups are believed to be within the invention. Examples of such reduction of more complex compounds than those hitherto mentioned are the reduction of cholestanone to cholestanol; of coprastanone to coprasterole; of cholic acid and desoxycholic acid to the corresponding alcohols; of pregesterone to 4-dehydropregnanediol; and in general, of the reduction of compounds having the structure

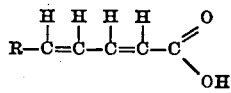

or

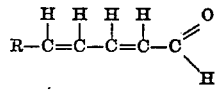

to compounds of the structure

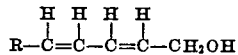

in which R is an organic radical, saturated or unsaturated, or a saturated or unsaturated cyclic radical.

Having described our invention in considerable detail, it is our intention that the invention be not limited by any of the details of description unless otherwise specified, but rather be construed broadly within its spirit and scope as set out in the accompanying claims.

We claim:

1. In the reduction of a chemical compound containing a reducible functional group including an atom other than hydrogen and carbon, the step which comprises associating the compound with a member of the class consisting of aluminum hydride and alkali metal aluminum hydrides at a reaction temperature sufficiently low that said member does not substantially thermally decompose during the reduction.

2. The method of claim 1 wherein the reactants are homogeneously mixed together in a substantially nonaqueuos medium.

3. The method of claim 1 wherein the reactants are associated together in a liquid phase.

4. The method of claim 1 wherein the reactants are associated together in a solvent in which both reactants are at least partially soluble.

5. The method of claim 1 wherein the reactants are associated together in an ether environment.

6. The method of claim 5 wherein the ether is diethyl ether.

7. In the reduction of a hydrocarbon derivative compound containing a reducible functional group including an atom other than hydrogen and carbon, the step which comprises associating the compound with a member of the class consisting of aluminum hydride and alkali metal aluminum hydrides at a reaction temperature sufficiently low that said member does not substantially thermally decompose during the reduction.

8. The method of claim 7 wherein the salt of the desired reduction product is formed and then hydrolyzed to produce the desired reduction product.

9. In the production of hydrides from an inorganic compound containing a reducible functional group including an atom other than hydrogen and carbon, the step which comprises associating the compound with a member of the class consisting of aluminum hydride and alkali metal aluminum hydrides at a reaction temperature sufficiently low that said member does not substantially thermally decompose during the reduction.

10. In the reduction of a hydrocarbon derivative compound containing a reducible functional group including an atom other than hydrogen and carbon and containing an unsaturated carbon to carbon link without reacting at said link, the step which comprises associating said compound with a member of the class consisting of aluminum hydride and alkali metal aluminum hydrides at a reaction temperature sufficiently low that said member does not substantially thermally decompose during the reduction.

11. The method of claim 10 wherein said compound contains more than one unsaturated carbon to carbon link.

12. The method of claim 10 wherein the compound contains conjugated double bonds.

13. In the reduction of a hydrocarbon derivative compound containing a carbonyl functional group, the step which comprises associating said compound with a member of the class consisting of aluminum hydride and alkali metal aluminum hydrides at a reaction temperature sufficiently low that said member does not substantially thermally decompose during the reduction.

14. In the reduction of a hydrocarbon derivative compound having a nitrogen-containing functional group, the step which comprises associating said compound with a member of the class consisting of aluminum hydride and alkali metal aluminum hydrides at a reaction temperature sufficiently low that said member does not substantially thermally decompose during the reduction.

15. In the reduction of a hydrocarbon derivative compound containing an ester group, the step which comprises associating the compound with a member of the class consisting of aluminum hydride and alkali metal aluminum hydrides at a reaction temperature sufficiently low that said member does not substantially thermally decompose during the reduction.

16. In the reduction of a hydrocarbon derivative compound containing a ketone group, the step which comprises associating the compound with a member of the class consisting of aluminum hydride and alkali metal aluminum hydrides at a reaction temperature sufficiently low that said member does not substantially thermally decompose during the reduction.

17. In the reduction of a hydrocarbon derivative compound containing an acid group, the step which comprises associating said compound with a member of the class consisting of aluminum hydride and alkali metal aluminum hydrides at a reaction temperature sufficiently low that said member does not substantially thermally decompose during the reduction.

18. In the reduction of a hydrocarbon derivative compound containing a reducible functional group including an atom other than hydrogen and carbon, the step which comprises associating said compound with an aluminum halide and a member of the class consisting of alkali metal hydrides and a solvent at a reaction temperature sufficiently low that said member does not substantially thermally decompose during the reduction.

19. The method of claim 18 wherein the aluminum halide is the chloride.

20. The method of claim 18 wherein the aluminum halide is the bromide.

21. The method of claim 18 wherein the solvent is an ether.

22. In the reduction of an inorganic compound containing a functional group including an atom other than carbon and hydrogen, the step which comprises associating said compound with an aluminum halide, an alkali metal hydride and a solvent at a reaction temperature sufficiently low that said member does not substantially thermally decompose during the reduction.

23. A substantially anhydrous ether solution of a member of the class consisting of alkali metal aluminum hydrides and aluminum hydride, said last mentioned aluminum hydride being prepared in said ether by reacting aluminum chloride with a member of the class consisting of alkali metal hydrides and alkali metal aluminum hydrides in the presence of said ether.

24. The solution of claim 23 wherein said ether is diethyl ether.

25. A substantially anhydrous ether solution of aluminum hydride prepared by reacting aluminum chloride with a member of the class consisting of alkali metal hydrides and alkali metal aluminum hydrides in the presence of said ether.

26. The solution of claim 25 wherein said ether is diethyl ether.

27. In the reduction of a hydrocarbon derivative compound having a halide-containing functional group, the step which comprises associating said compound with a member of the class consisting of aluminum hydride and alkali metal aluminum hydrides at a reaction temperature sufficiently low that said member does not substantially thermally decompose during the reduction.

HERMANN I. SCHLESINGER.
ALBERT E. FINHOLT.

REFERENCES CITED

The following references are of record in the file of this patent:

UNITED STATES PATENTS

| Number | Name | Date |
|---|---|---|
| 1,521,708 | Reacock | Jan. 6, 1925 |
| 2,109,708 | Pfister | Mar. 1, 1938 |
| 2,263,195 | Shikata | Nov. 18, 1941 |
| 2,425,711 | Alexander | Aug. 19, 1947 |
| 2,427,339 | Alexander | Sept. 16, 1947 |
| 2,427,791 | Ipatieff et al. | Sept. 23, 1947 |

FOREIGN PATENTS

| Number | Country | Date |
|---|---|---|
| 709,227 | Germany | Aug. 9, 1941 |

OTHER REFERENCES

Tomkinson: Chemical News, May 27, 1921, vol. CXXII.

Finholt et al.: Abstracts of Papers, 110th Meeting Am. Chem. Soc., September 9–13 (1946), page 27P.

Brown et al.: Ibid., pages 27P–28P.

Stecher et al.: Berichte, vol. 75, 2003–12 (1942).

"Reduction of Organic Compounds by Lithium Aluminum Hydride," by Nystrom et al., Journal of the American Chem. Soc., vol. 69, pages 1197 to 1199 (1947).